Dec. 2, 1969 E. CRYER 3,482,194

FUSE HOLDERS FOR USE WITH FLEXIBLE PRINTED CIRCUITS

Filed May 8, 1968

INVENTOR
Edward Cryer
BY Glascock, Downing & Seebold
ATTORNEYS

United States Patent Office 3,482,194
Patented Dec. 2, 1969

3,482,194

FUSE HOLDERS FOR USE WITH FLEXIBLE PRINTED CIRCUITS

Edward Cryer, Burnley, England, assignor to Joseph Lucas (Industries) Limited, Birmingham, England, a British company Filed May 8, 1968, Ser. No. 727,579
Claims priority, application Great Britain, May 15, 1967, 22,401/67
Int. Cl. H01h *85/14, 85/02*
U.S. Cl. 337—227 2 Claims

ABSTRACT OF THE DISCLOSURE

A fuse holder for use with a flexible printed circuit includes an insulating base on which the flexible printed circuit is placed. A pair of fuse clips extend through the base and the printed circuit and are releasably engaged with the base, each clip defining a fuse engaging portion at its end remote from the printed circuit, and including at its end adjacent the printed circuit, a resilient arm. The resilient arm of each clip engages a respective exposed area of the printed circuit, so that in use a fuse engaged with the clips is electrically connected, through the clips, between the exposed areas of the printed circuit.

This invention relates to fuse holders for use with flexible printed circuits.

A fuse holder according to the invention includes an insulating base on which the flexible printed circuit is placed and a pair of fuse clips extending through the base and the printed circuit and releasably engaged with the base, each clip defining a fuse engaging portion at its end remote from the printed circuit and including, at its end adjacent the printed circuit, a resilient arm which engages a respective exposed area of the printed circuit so that in use the fuse is electrically connected, through the clips, between the exposed areas of the printed circuit.

Figure 1:
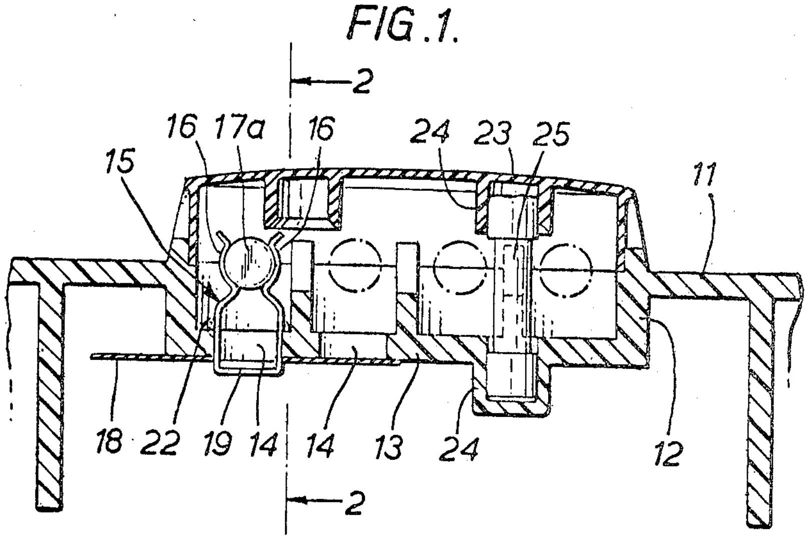
Figure 2:
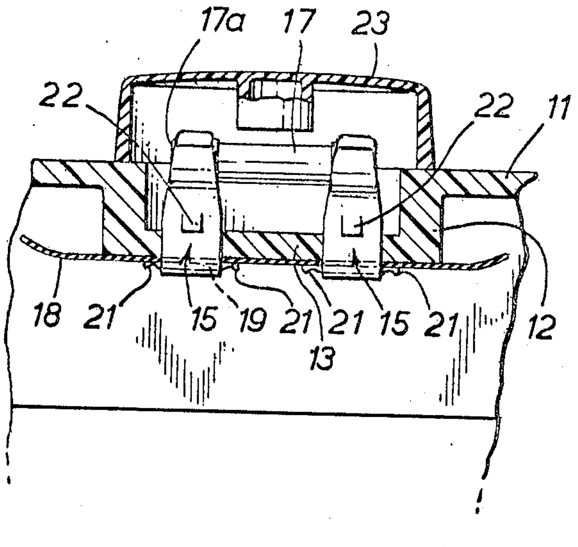

One example of the invention is illustrated in the accompanying drawings wherein FIGURE 1 is a sectional view of a fuse holder integral with a road vehicle facia panel and FIGURE 2 is a part sectional view on the line 2—2 in FIGURE 1 with parts thereof omitted for clarity.

Referring to the drawings, there is provided a synthetic resin facia panel 11 for a road vehicle, including an open box like portion 12 the base 13 of which constitutes the base of a fuse holder. The base 13 is formed with a plurality of pairs of square holes 14 arranged in two parallel lines. Extending through each of the holes 14 into the box like portion 12 is a generally U shaped resilient conductive clip portion 15, the free ends of the limbs of which are shaped to define substantially semi-circular portions 16. The portions 16 are arranged facing one another so that one of the cylindrical conductive end caps 17*a* of a cartridge fuse 17 can be gripped therebetween.

A flexible printed circuit 18 having holes formed therein through which the clip portions 15 pass is placed on the outer surface of the base 13 and the areas of the conductors of printed circuit surrounding the holes 14 are exposed.

Trapped between the base of each clip portion 15 and the printed circuit 18 is a conductive plate 19 having integral therewith, and extending from opposite sides thereof, a pair of resilient curved arms 21. When each clip portion 15 is engaged with the base an integral tag

22 extending outwardly from each of the limbs of the clip portion 15 engages the inner surface of the base 13, while the arms 21 of the respective plate 19 engage the exposed area of the conductor of the flexible printed circuit 18.

Thus the tags 22 prevent the clip portions 15 being withdrawn outwardly from the base 13 and the arms 21 of the plates 19 prevent the clip portions 15 being withdrawn inwardly from the base 13, the arrangement being such that the arms 21 of the plates 19 are stressed into contact with the respective exposed areas of the conductors of the printed circuit 18 to ensure that there is a good electrical connection between the clip portions 15 and the respective conductors of the printed circuit 18. The clip portions 15 occupying a pair of the holes 14 in the base 13 have engaged between them a cartridge fuse 17 so that the cartridge fuse electrically interconnects the conductors of the printed circuit 18 associated with the clip portions 15 respectively.

The open end of the box like portion 12 is closed in use by a moulded synthetic resin cover 23 which is a snap fit with the walls of the portion 12. Thus the limbs of the clip portions 15 and the fuses 17 engaged therebetween are totally enclosed. The base 13 and the cover 23 are provided with aligned recesses 24 within which the ends respectively of a spare cartridge fuse 25 are engaged.

It will be appreciated that the portion 12 need not be integral with the panel 11 but could be a separate moulding having means thereon for attaching it to another part of the vehicle.

The clip constituted by the clip portion 15 and the plate 19 could of course be a one-piece construction.

Having thus described my invention what I claim as new and desire to secure by Letters Patent is:

1. A fuse holder in combination with a flexible printed circuit, an insulating base on which the flexible printed circuit is placed; and a pair of fuse clips extending through the base and the printed circuit and releasably engaged with the base, each clip defining a fuse engaging portion at its end remote from the printed circuit and including, at its end adjacent the printed circuit, a resilient arm which engages a respective exposed area of the printed circuit so that in use the fuse is electrically connected, through the clips, between the exposed areas of the printed circuit, and an integral tag securing said clip to said base whereby a firm electrical connection is made between said resilient arm and said flexible printed circuit.

2. A holder as claimed in claim 1 in which said base is integral with a facia panel of a road vehicle.

References Cited

UNITED STATES PATENTS

| | | | |
|---|---|---|---|
| 2,587,568 | 2/1952 | Eisler | 339—17 |
| 2,757,319 | 7/1956 | Kapp | 339—17 X |
| 2,777,118 | 1/1957 | Sundt | 337—195 X |
| 2,898,519 | 8/1959 | Foster | 339—17 X |
| 3,148,438 | 9/1964 | Winter et al. | 339—17 |
| 3,308,418 | 3/1967 | Hedstrom | 339—17 X |

BERNARD A. GILHEANY, Primary Examiner

H. B. GILSON, Assistant Examiner

U.S. Cl. X.R.

337—17, 195